US006477439B1

(12) United States Patent
Bernaden, III et al.

(10) Patent No.: US 6,477,439 B1
(45) Date of Patent: Nov. 5, 2002

(54) METHOD OF PROGRAMMING AND EXECUTING OBJECT-ORIENTED STATE MACHINE LOGIC IN A CONTROLLER

(75) Inventors: Alex Bernaden, III, Greenfield, WI (US); Gaylon M. Decious, Shorewood, WI (US); John E. Seem, Shorewood, WI (US); Kirk H. Drees, Cedarburg, WI (US); Jonathan D. West, Shorewood, WI (US); William R. Kuckuk, Hubertus, WI (US)

(73) Assignee: Johnson Controls Technology Corporation, Plymouth, MI (US)

( * ) Notice: Subject to any disclaimer, the term of this patent is extended or adjusted under 35 U.S.C. 154(b) by 0 days.

(21) Appl. No.: 09/112,620

(22) Filed: Jul. 9, 1998

Related U.S. Application Data

(63) Continuation-in-part of application No. 09/054,429, filed on Apr. 3, 1998.
(60) Provisional application No. 60/081,295, filed on Apr. 10, 1998.

(51) Int. Cl.$^7$ .............................................. G06F 19/00
(52) U.S. Cl. ................. 700/103; 707/103 R; 707/104.1
(58) Field of Search ......................... 700/86, 103, 79; 707/102, 103, 104, 503, 509

(56) References Cited

U.S. PATENT DOCUMENTS

| | | | | |
|---|---|---|---|---|
| 5,377,315 A | * | 12/1994 | Leggett ...................... 345/440 |
| 5,809,235 A | * | 9/1998 | Sharma et al. ............... 709/230 |
| 5,847,659 A | * | 12/1998 | Mugitani ............... 340/825.29 |
| 5,864,479 A | * | 1/1999 | Hallwirth ..................... 700/23 |
| 5,918,051 A | * | 6/1999 | Savitzky et al. ............ 709/315 |
| 5,920,718 A | * | 7/1999 | Uczekaj et al. ................ 717/2 |
| 6,028,998 A | * | 2/2000 | Gloudeman et al. ........... 717/1 |
| 6,038,590 A | * | 3/2000 | Gish .......................... 709/203 |
| 6,104,963 A | * | 8/2000 | Cebasek et al. .............. 700/86 |
| 6,119,125 A | * | 9/2000 | Gloudeman et al. .... 707/103 R |
| 6,167,319 A | * | 12/2000 | Harris et al. .................. 700/86 |

OTHER PUBLICATIONS

Sakena et al., Schedulability Analysis for Automated Implementations of Real-Time Object-Oriented Models, 1998, IEEE, whole article.*
Rational Rose Software Coproration, 1996, UML Booch & OMT Quick Reference, all pages.*
Rational Rose Software Coporation, 1996, Rational Rose, all pages.*
Science of Computer Programming, *Statecharts: A Visual Formalism For Complex Systems,* vol. 8, (1987) pp. 231–274.
U.S. patent application Ser. No. 09/054,696, Gloudeman et al., filed Apr. 3, 1998.

* cited by examiner

*Primary Examiner*—Leo Picard
*Assistant Examiner*—Chad Rapp
(74) *Attorney, Agent, or Firm*—Foley & Lardner (57) ABSTRACT

A method is disclosed for programming and executing a state machine control program represented as a diagram in an HVAC controller. The diagram is converted to tabular data which is entered into one or more spreadsheet pages. The tabular data includes the defined output states, the defined input states and defined transition states, whereby a given output state and a given set of inputs will cause transition to a next output state. The tabular data is translated, through execution of a routine in a macro-instruction language, into a plurality of data structures for downloading into a finite state machine object data structure in the controller, where it will be acted upon by an object-oriented execution module, referred to as a class execute method, which is also present in the controller.

11 Claims, 10 Drawing Sheets

| FINITE STATE MACHINE OBJECT SNAPSHOT ||
|---|---|
| OBJECT<br>  OBJECT NAME<br>  DESCRIPTION<br>  STATUS<br>  ENABLED ||
| ENGINEERING DATA | OBJECT DETAILS |
|   PRESENT_VALUE<br>  EXT_PRESENT_VALUE<br>  INPUT<br>  EVENT_GUARD_MASK<br>  STATE_MASK<br>  STATE_COMPARE<br>  INPUT_MASK<br>  INPUT_COMPARE<br>  NEXT_PRESENT_VALUE<br>  NEXT_EXT_PRESENT_VAL<br>  TRANSITION_LOG_SIZE<br>  TRANSITION_LOG_INDEX<br>  INX_PRESENT_VALUE<br>  INX_PREV_PRESENT_VAL<br>  INX_TRANSITION_NO<br>  INX_TRANSITION_TIME<br>  STATES_TEXT |   EXECUTION PRIORITY<br>  OBJECT CATEGORY<br>  FUNCTIONAL NAME<br>  SHORT REFERENCE<br>  FULL REFERENCE<br>  OBJECT IDENTIFIER // INTERNAL<br>  OBJECT TYPE // INTERNAL<br>  DEVICE NAME // INTERNAL<br>  REFERENCE COUNT // INTERNAL<br>  INSTANCE SIZE // INTERNAL<br>  PMI REFRESH // INTERNAL<br>  PARENT OID // INTERNAL<br>  VERSION // INTERNAL |

| | A | B | C | D | E | F | G | H | I |
|---|---|---|---|---|---|---|---|---|---|
| | A2 | | | | | | | | |
| 1 | BOOLEAN LIST - MAIN STATE MACHINE | | | | | | | | |
| 2 | | | | ### | | | | | |
| 3 | 1 | G | LOW LIMIT OVERRIDE=T | 1 | 0 | | | | |
| 4 | 2 | G | WATER SYSTEM FLUSH OVERRIDE=T | 2 | 0 | | | | |
| 5 | 3 | G | SHUTDOWN CLOSED OVERRIDE=T | 4 | 0 | | | | |
| 6 | 4 | G | SHUTDOWN OPEN OVERRIDE=T | 8 | 0 | | | | |
| 7 | 5 | G | WARMUP OVERRIDE=T | 16 | 0 | | | | |
| 8 | 6 | G | Tzn>Tzn sp.clg | 32 | 0 | | | | |
| 9 | 7 | E | *CgHD LoSat=T* | 64 | 64 | | | | |
| 10 | 8 | G | Tzn<Tzn sp.htg | 128 | 64 | | | | |
| 11 | 9 | G | HEATING LOCKOUT=T | 256 | 64 | | | | |
| 12 | 10 | E | *HEATING FSM.PRESENT VALUE=NO HEATING REQUIRED* | 512 | 576 | | | | |
| 13 | 11 | G | HtgConfig=COOLING ONLY | 1024 | 576 | | | | |
| 14 | 12 | G | NOT USED | 2048 | 576 | | | | |
| 15 | 13 | G | NOT USED | 4096 | 576 | | | | |
| 16 | 14 | G | NOT USED | 8192 | 576 | | | | |
| 17 | 15 | G | NOT USED | 16384 | 576 | | | | |
| 18 | 16 | G | NOT USED | 32768 | 576 | | | | |
| 19 | 17 | G | NOT USED | 65536 | 576 | | | | |
| 20 | 18 | G | NOT USED | 131072 | 576 | | | | |
| 21 | 19 | G | NOT USED | 262144 | 576 | | | | |
| 22 | 20 | G | NOT USED | 524288 | 576 | | | | |
| 23 | 21 | G | NOT USED | 1048576 | 576 | | | | |
| 24 | 22 | G | NOT USED | 2097152 | 576 | | | | |
| 25 | 23 | G | NOT USED | 4194304 | 576 | | | | |

VAV MODE FSM \ VAV MODE FSM_AUTO \ HEATING MAIN \ STATE LIST \ BOOLEANS \ GENERATE T

| TRANSITION NUMBER | STATE_MASK | STATE_COMPARE | INPUT_MASK | INPUT_COMPARE | NEXT_PRESENT_VALUE | NEXT_EXT_PRESENT_VAL | EVENT_MASK |
|---|---|---|---|---|---|---|---|
| 0 | 3584 | 0 | 1 | 1 | 4 | 96 | |
| 1 | 3584 | 0 | 2 | 2 | 3 | 97 | |
| 2 | 3584 | 0 | 4 | 4 | 0 | 64 | |
| 3 | 3584 | 0 | 8 | 8 | 1 | 65 | |
| 4 | 3584 | 0 | 16 | 16 | 2 | 32 | |
| 5 | 4064 | 96 | 0 | 0 | 5 | 0 | |
| 6 | 4064 | 64 | 0 | 0 | 5 | 0 | |
| 7 | 4064 | 32 | 0 | 0 | 6 | 0 | |
| 8 | 4095 | 0 | 32 | 32 | 5 | 0 | |
| 9 | 4095 | 1 | 64 | 64 | 6 | 1 | |
| 10 | 4095 | 0 | 1408 | 1408 | 7 | 0 | |
| 11 | 4095 | 2 | 256 | 256 | 5 | 2 | |
| 12 | 4095 | 2 | 512 | 512 | 5 | 0 | |
| 13 | 4095 | 2 | 1024 | 1024 | 5 | 0 | |

EVENT_GUARD_MASK=576
STATE_MASK=(3584,3584,3584,3584,3584,4064,4064,4064,4095,4095,4095,4095,4095,4095)
STATE_COMPARE=(0,0,0,0,0,96,64,32,0,1,0,2,2,2)
INPUT_MASK=(1,2,4,8,16,2,0,0,32,64,1408,256,512,1024)
INPUT_COMPARE=(1,2,4,8,16,0,0,0,32,64,128,256,512,1024)
NEXT_PRESENT_VALUE=(4,3,0,1,2,5,5,6,6,7,5,5,5)
NEXT_EXT_PRESENT_VAL=(96,97,64,65,32,0,0,0,1,0,2,0,0,0)

HEATING MAIN / STATE LIST / BOOLEANS / GENERATE TRANSITION CODE / FSM TRANSITION INFO

FIG. 9

METHOD OF PROGRAMMING AND EXECUTING OBJECT-ORIENTED STATE MACHINE LOGIC IN A CONTROLLER

CROSS REFERENCE TO RELATED APPLICATIONS

This application is a continuation-in-part of application Ser. No. 09/054,429, filed Apr. 3, 1998. The benefit of the earlier filing date of Provisional Application No. 60/081,295, filed Apr. 10, 1998, is also claimed herein.

TECHNICAL FIELD

The field of the invention is the control of building systems, and more particularly, the control of heating, ventilating and air conditioning (HVAC) systems.

BACKGROUND ART

In the parent application cited above, a controller implements both continuous and discrete control for a heating, ventilating and air conditioning (HVAC) system for a building. The system has sensors for sensing the environmental conditions, such as air flow and temperature, and has system elements such as air flow dampers and heaters, for changing the environmental conditions. The apparatus includes a state machine controller which transitions from one defined output state to another defined output state upon sensing the state of one of more inputs according to state machine logic.

Prior HVAC controllers of the present assignee have utilized an object-oriented networked operating system, known as Metasys with NOAH objects, which has been described in U.S. patent application No. 09/054,690, filed Apr. 3, 1998, which is entitled "Application-Centric Building Automation Software Components" and which is assigned to the assignee of the present invention.

SUMMARY OF THE INVENTION

The present invention provides a method and apparatus for programming and executing the state machine control program described in the controller of the prior application. The present invention not only provides for programming and downloading of such a program, but also provides data structures for downloading into an object-oriented data structure in the controller for execution by an object-oriented execution routine in the controller.

The programming system utilizes graphical programming displays, which are easy to observe and use in entering state machine logic programs. In a preferred embodiment, the programming software is provided by a commercially available general purpose program such as Microsoft Excel for Windows®, Version 7.0. Other types of spreadsheet software, or other types of programming interfaces could also be used. In the preferred embodiment, a state machine diagram of a type familiar to those of ordinary skill in the art is converted to tabular data which is entered into several spreadsheet pages. The tabular data includes the defined output states, the defined input states and defined transition states, whereby a given output state and a given set of inputs will cause transition to a next output state.

The tabular data is translated, through generation of routine in the Excel macro programming language, into a data structure including a plurality of tables. This data structure is loaded into one or more files for downloading. The files are then downloaded and the data is loaded into a finite state machine object data structure in the controller, where it will be acted upon by an object-oriented execution module, referred to as a class execute method, which is also present in the controller. Thus, there is an execution routine and a state machine object data structure in the controller.

Still further, the invention provides for programming a state logic program for multi-level state diagrams which include superstates and one or more levels of substates.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention and, therefore, reference is made to the following claims which follow the description for determining the scope of the invention.

DETAILED DESCRIPTION OF THE PREFERRED EMBODIMENTS

Figure 1:
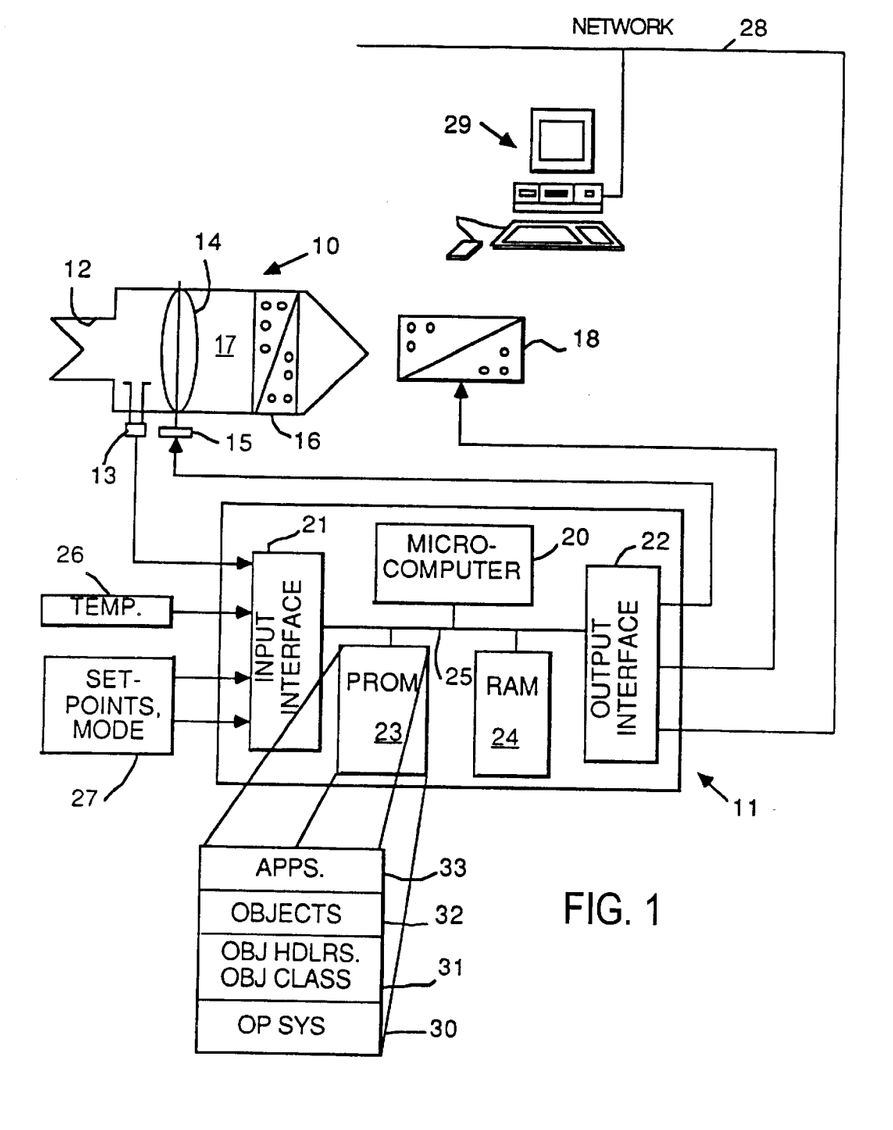
FIG. 1 is a schematic view of a controller and a programming terminal according to the present invention, including a detail diagram of the firmware present in the controller of FIG. 1.

FIG. 1 illustrates a variable-air-volume (VAV) terminal unit 10, electrically connected to a VAV controller 11, to control air temperature by delivering a variable amount of conditioned air into a controlled area of a building, sometimes referred to as a heating/air conditioning zone. The VAV controller 11 controls the quantity and rate of thermal energy which the VAV terminal unit 10 discharges into the zone to meet the thermal loads of the zone.

The VAV terminal unit 10 has an inlet 12 for receiving a supply of air from a conventional air handling uint. An air flow sensor 13 senses a volume of air flow into the unit 19. A damper 14 and a damper actuator 15 act as a throttle for controlling the air flow through and out of VAV terminal unit 10. For example, if heating or cooling is not required, damper 14 may be adjusted to its minimum flow setting. Should heat be required, a box heat coil 16 is activated to warm the air flowing through chamber 17 and if a greater amount of heat is required, a supplemental heat coil 18, such as baseboard heating or radiant panels, may be activated.

The VAV controller 11 includes a microelectronic CPU 20, input interface circuits 21, output interface circuits 22, a non-volatile program memory (PROM) 23, and a random access memory (RAM) 24 all interconnected by a set of signal buses 25, including address, data and control buses.

The input circuits 21 interface to input devices, such as temperature sensors 26, and a thermostatic control 27 for controlling set points and modes of operation. Such a control 27 may be analog or digital, but should provide separate setpoints for heating and cooling states of operation and for different time periods during the day.

VAV terminal unit 10 and controller unit 11 can operate in a standalone manner, or can be connected through a network 28, such as the Metasys Network system available from Johnson Controls, Inc. of Milwaukee, Wis. VAV controller unit 11 communicates through an N2 bus or an N3 bus (not separately shown), respectively, of the Metasys network 28. A programming terminal 29, which may be a typical Pentium-based PC running the Microsoft Windows 95 operating system, is connected on either the N2 bus or the N3 bus of the network 28 to communicate with controller unit 11. Another network could be used, if such network provided the functions described herein.

FIG. 1 also shows a diagram of the firmware that is stored in the non-volatile program memory 23. This includes a real-time operating system 30 that will also execute object-oriented programs (OOP).

In OOP, the state and behavior of a program element—its data and operations on data—are combined in a high-level unit, an object, that has special language support. An object is a group of related functions and a data structure that serves those functions. The functions are known as methods, and the fields of an object-oriented data structure are known as instance variables. The methods insulate the instance variables from other parts of the object-oriented program. A "class" defines, in an abstract way, the form of the object that will form a part of the overall program and one class can include several objects. Objects communicate with each other through messages, which are requests to perform a method related to the receiving object. Classes can be linked in class hierarchies which include superclasses and subclasses and object-oriented programming provides for inheritance of methods and instance variables by subclasses and superclasses, subject to certain allowed modifications.

As shown in FIG. 1, object handlers and object class firmware 31 are provided for handling the standard objects 32, of which one is a state machine object 34 to be described below. Application level programs and routines 33 are provided to create other standard objects. Standard objects are characterized by input attributes, output attributes, views, commands, and methods.

Attributes define data and data structures. Views define how data from the object is grouped and laid out for display to a human observer at the programming terminal 29. Commands are operations that may be executed to operate on data in the object and are generally on an internal level not seen by a human operator. Methods are higher level operations that operate on data in the object and include class startup methods, class execute methods, class read and class write methods and class validate methods.

Figure 3:
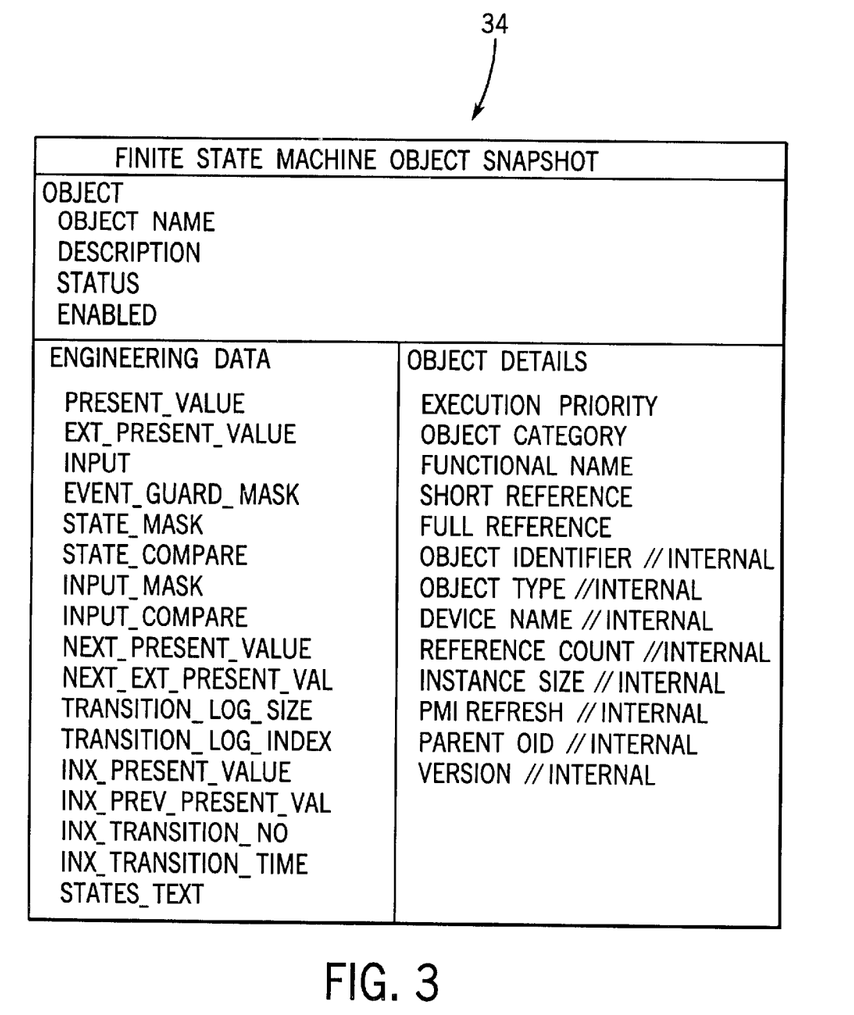
FIG. 3 is a map of a state machine object which is present in the controller in FIG. 1.

FIG. 3 shows a diagram of the state machine object 34. Data for this object is programmed in the controller 11, through the programming terminal 29 in FIG. 1, through execution of a routine illustrated in FIG. 4. In a preferred embodiment, the programming software for the terminal 29 is provided by a commercially available general purpose program such as Microsoft Excel for Windows®, Version 7.0. Other types of spreadsheet software, or other types of programming interfaces could also be used.

In the preferred embodiment, a state machine diagram (FIG. 2) of a type familiar to those of ordinary skill in the art is converted to tabular data which is entered into one or more spreadsheet pages (FIGS. 5–8). The tabular data includes the defined output states, the defined input states and defined transition states, whereby a given output state and a given set of inputs will cause transition to a next output state.

Figure 4:
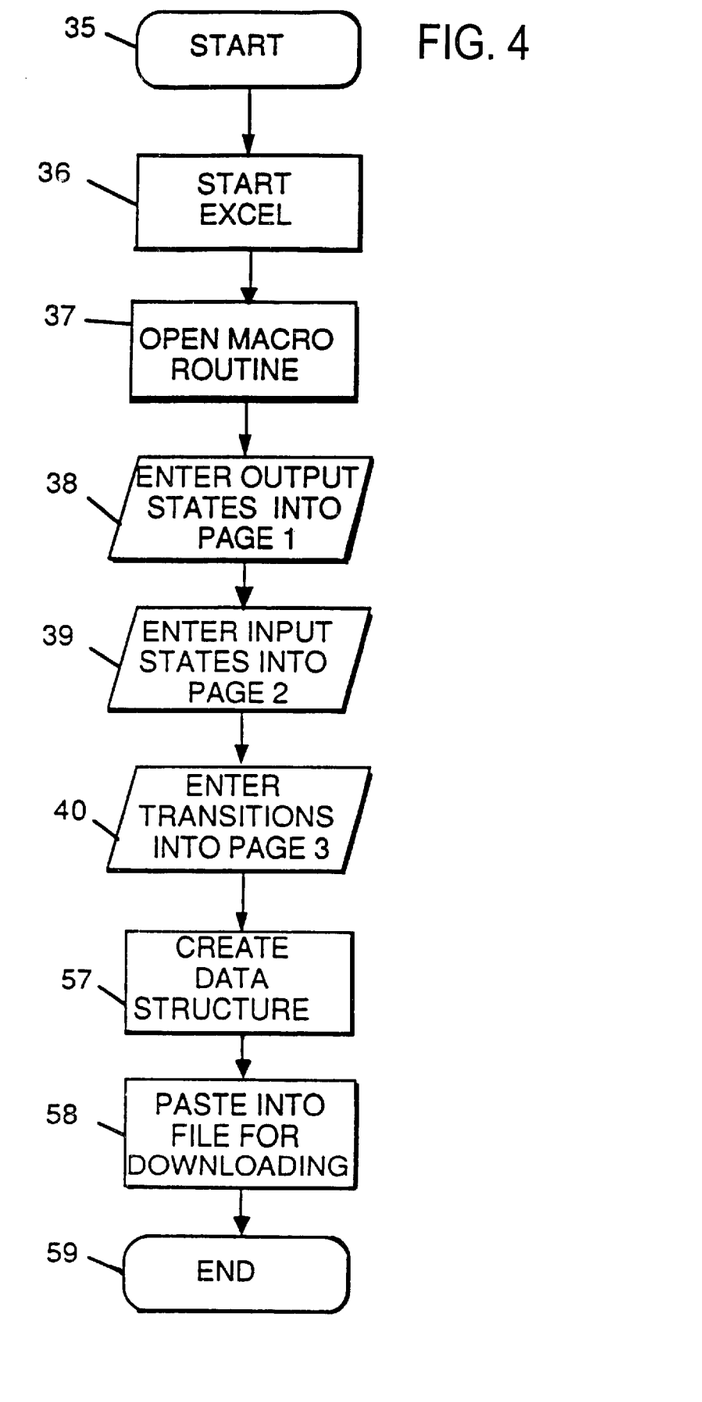
FIG. 4 is a flow chart of the steps for entering a program in the programming terminal of FIG. 1.
Figure 9:
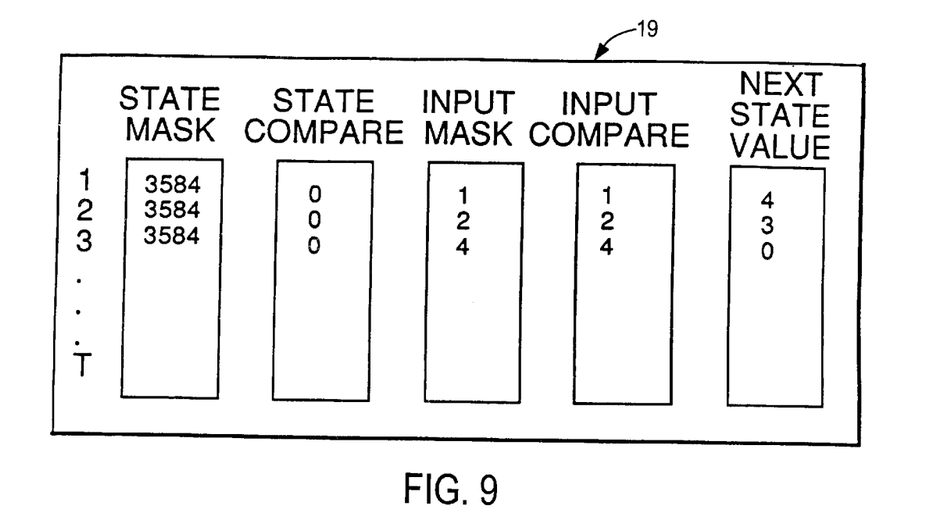
FIG. 9 is a diagram of tables forming the data structure resulting from the programming steps shown in FIG. 4.
Figure 10:
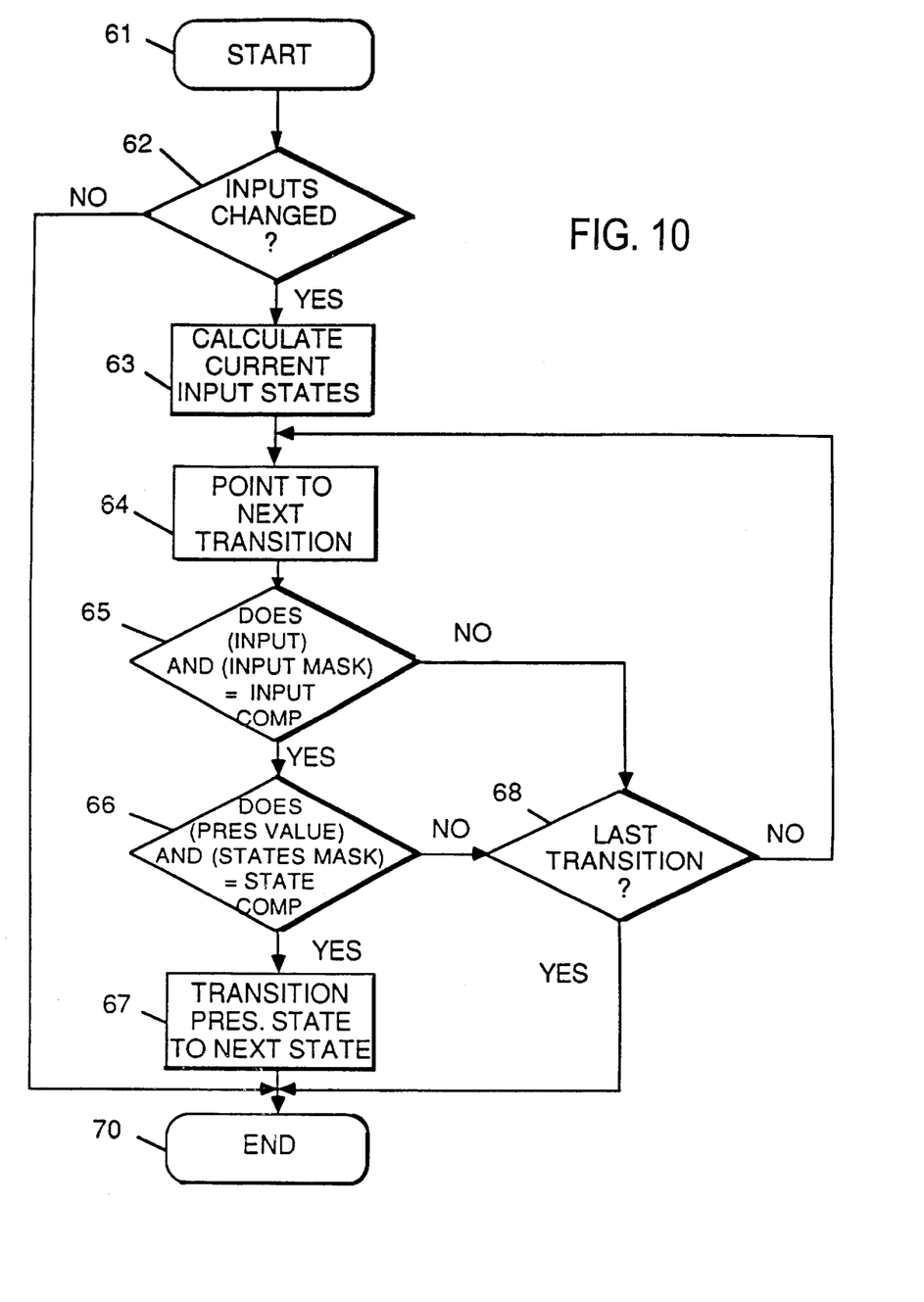
FIG. 10 is a flow chart of a class execute routine which operates on the state machine object to carry out state logic control in the controller of FIG. 1.

The tabular data is translated, through execution of routine in FIG. 4, in the Excel macro programming language, into a data structure 19 having a plurality of related tables (FIG. 9). This data structure 19 is loaded into one or more files for downloading. The files are then downloaded and the data is loaded into a finite state machine object data structure 34 (FIG. 3) in the controller 11 (FIG. 1). There, it will be acted upon by an object-oriented execution module, referred to as a class execute method. This execution routine, represented in FIG. 10 is stored in the program memory 23 and executed by the CPU 20. This execution routine provides the logic which completes the relationship and cooperation of the tables in the data structure 19.

Referring to FIG. 4, the programming routine in the programming terminal 29 includes a startup instruction represented by startup block 35 to turn on power and start up the operating system on the programming terminal 29. Next, an instruction represented by process block 36 is executed to startup the Microsoft Excel for Windows application program. Then, further instructions, represented by process block 37, are executed to run the script written in the Excel macro programming language. The execution of this routine will generate a binary file with the .XLS file type designator.

Figure 2:
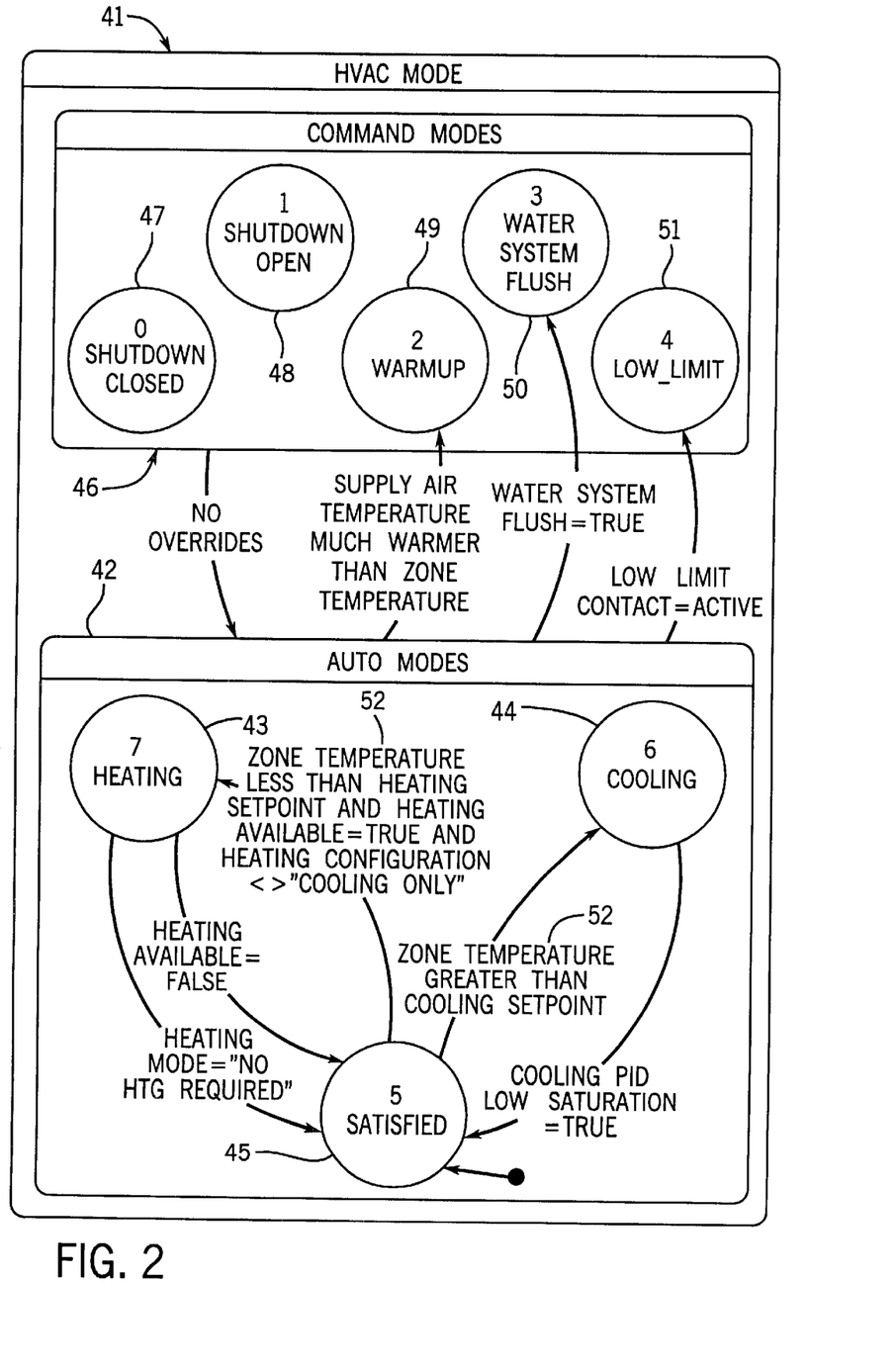
FIG. 2 is a state transition diagram which is the basis for entering a program into the programming terminal of FIG. 1.

FIG. 2 illustrates a state table diagram to be implemented in the present example. The controller 11 has a superstate 41 referred to as the HVAC mode for controlling heating and air conditioning, and this is represented by the outside box 41 in FIG. 2. Within this superstate 41 is a first substate, the automatic control mode (auto) represented by box 42, and its second-tier substates of "Heating", "Cooling" and "Satisfied" (no heating or cooling action required), represented by bubbles 43–45, respectively. Other substates at the same tier as auto are the command substates within box 46, including "Shutdown Open," "Shutdown Closed", "Warmup", "Water System Flush" and "Low Limit," represented by bubbles 47–51 located within box 46. Also shown are certain conditions 52, represented by arcs with legends in FIG. 2, which define input conditions that will cause transition from one of the output substates 43–45 or 47–51 to another of these substates.

Figure 5:
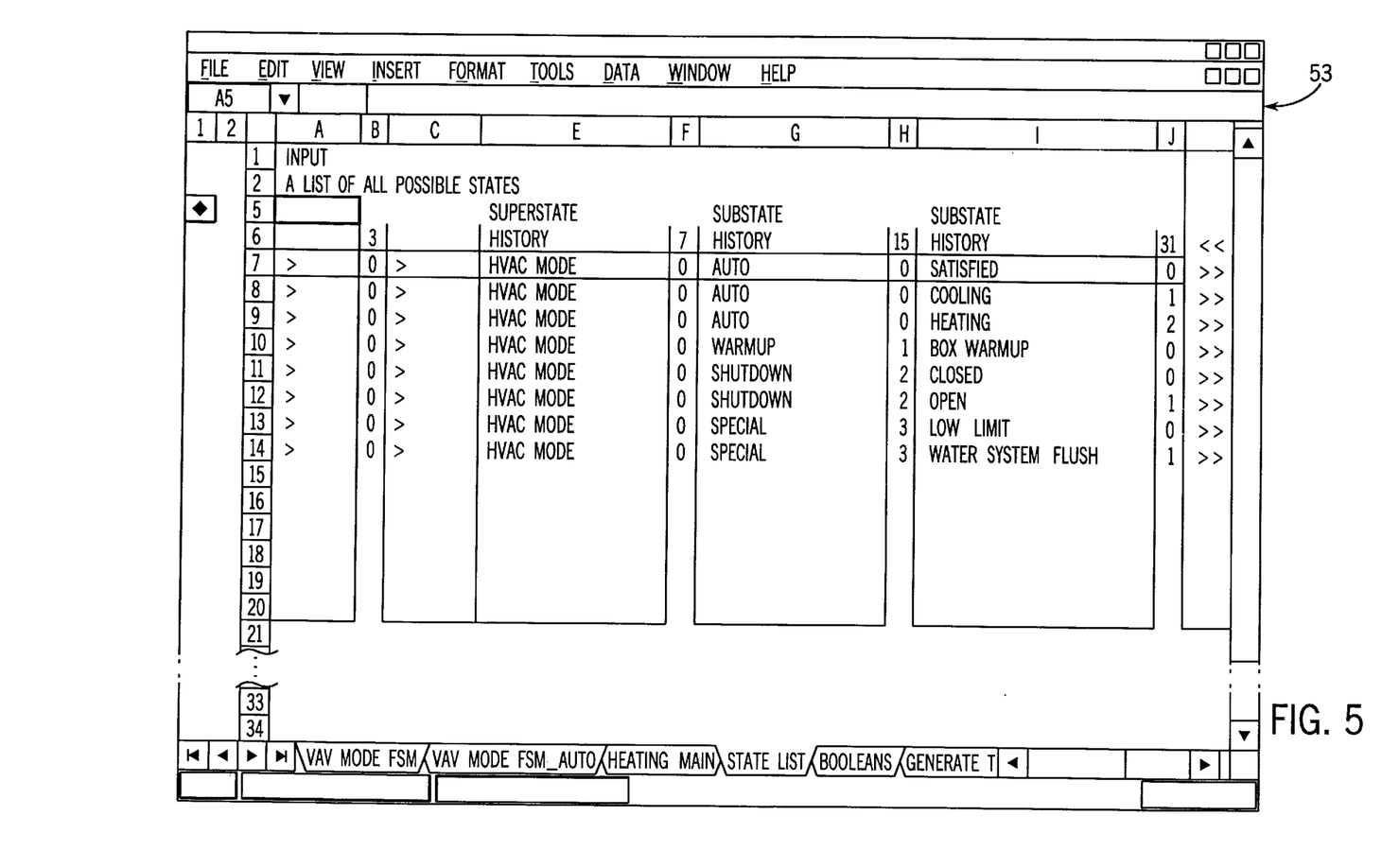
FIGS. 5–8 are screen displays which are seen on the programming terminal of FIG. 1, as the programming steps are executed according to FIG. 4.

Referring next to FIG. 5 (and as represented by process block 38 in FIG. 4), to define the output states, three columns of an Excel spreadsheet page 53 are given headings "Superstate", "Substate" and "Substate", respectively. There is only one superstate, the HVAC mode, so it is entered in cells 7–14 in column E. Then, the first tier substates are entered in column G, cells 7–14, including "Auto" three times (to accommodate 3 second-tier substates in Column I, "Warmup", "Shutdown" and "Special", two times each, to accommodate substates in Column I. In column I, cells 7–14, the substates for "Auto" are "Satisfied", "Cooling" and "Heating" (cells 7, 8 and 9), the substate for "Warmup" is Box Warmup (cell 10), the substates for "Shutdown" are "Closed" and "Open" (cells 11 and 12), and the substates for "Special" are "Low Limit" and "Water System Flush" (cells 13 and 14).

Figure 6:
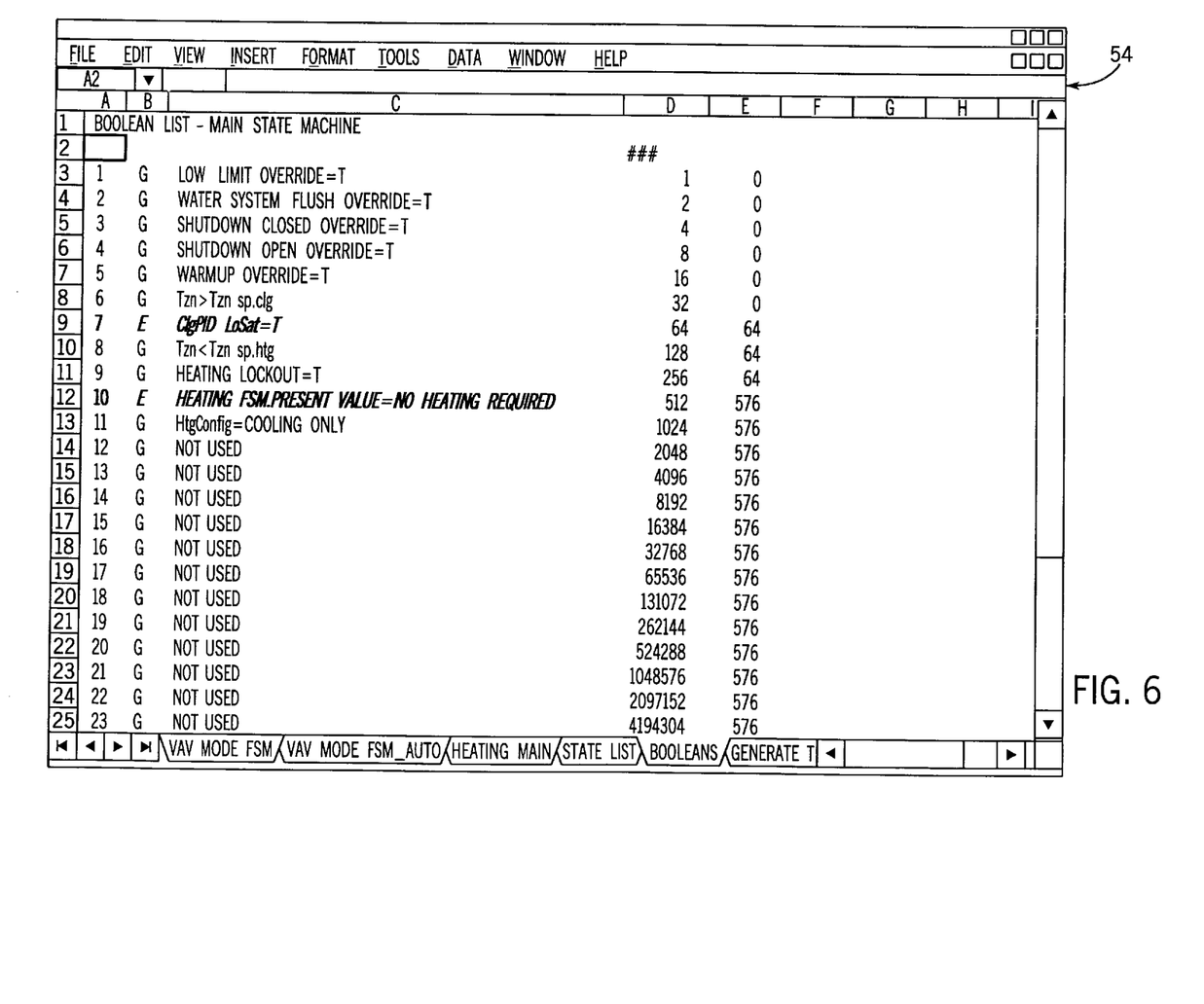

Referring next to FIG. 6 (and as represented by process block 39 in FIG. 4), to define the input states, the list of inputs is entered in another spreadsheet page 54. These are Boolean inputs, which can have true, false or don't care values. For example, a low order bit or Boolean input represents the state of low limit override signal, which when true (equal to a binary "1") means that the low limit should be invoked. "Override" in this instance, means a command from an operator that will cause the state machine controller to enter a specific state.

The inputs in this example are defined in Table 1 as follows:

TABLE 1

Definition of State Logic Inputs

| Bit | Description |
|---|---|
| 1 | Low Limit Override = T |
| 2 | Water System Flush Override = T |
| 3 | Shutdown Closed Override = T |
| 4 | Shutdown Open Override = T |
| 5 | Warmup Override = T |
| 6 | T(zone) > T(zone) Cooling Setpoint |
| 7 | Cooling PID Low Saturation = T |
| 8 | T(zone) < T(zone) Heating Setpoint |
| 9 | Heating Lockout = T |
| 10 | Heating Present Value = No Heating Required |
| 11 | Heating Configuration = Cooling Only |

The inputs are sensed and stored in data words in memory which may be two bytes or sixteen bits, in which eleven bits are used as described above. In the preferred embodiment, the input variable is actually thirty-two bits to provide additional capacity for inputs.

Figure 7:
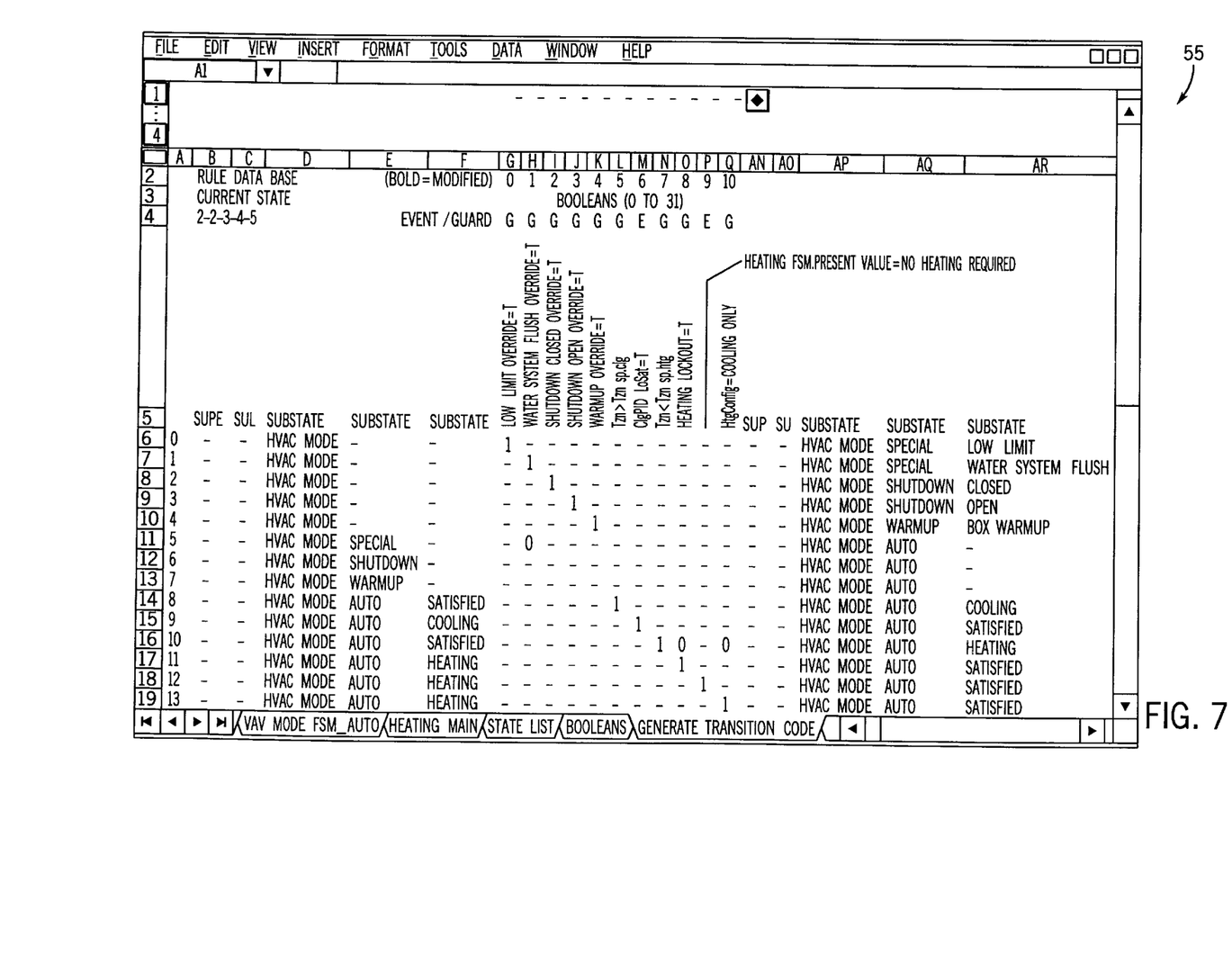

FIG. 7 illustrates the step carried out by execution of the process block 40 in FIG. 4. FIG. 7 shows a spreadsheet page 55 which maps the state transitions from one of thirteen present output states to one of thirteen next output states based on the collective value of the eleven input bits. For example, if the controller is in any HVAC mode and it senses one of the five override bits 1–5 (rows 3–7 in spreadsheet page 54), it will transition to one of the "Special", "Shutdown" or "Warmup" states according to which bit is sensed. Assuming the controller 11 is one of the "Special" substates, the sensing of a low signal ("0") will allow the controller to transition to the "Auto Mode" substate (row 12 in spreadsheet page 55 in FIG. 7). When in the "Auto Mode" substate and the "Satisfied" substate (row 14 in spreadsheet page 55 in FIG. 7), if the input sensing temperature above the cooling set point will cause a transition to the "Cooling" substate. When the controller 11 is in the "Auto Mode" substate and the "Satisfied" substate (row 16 in spreadsheet page 55 in FIG. 7), the sensing of a temperature less than the heating setpoint ("1"), the absence of a lockout command ("0"), and the absence of a cooling only mode command ("0"), will cause the controller 11 to transition to the "Heating" substate. The table contained in spreadsheet page 55 carries out the conditions seen in the state diagram in FIG. 2.

Figure 8:
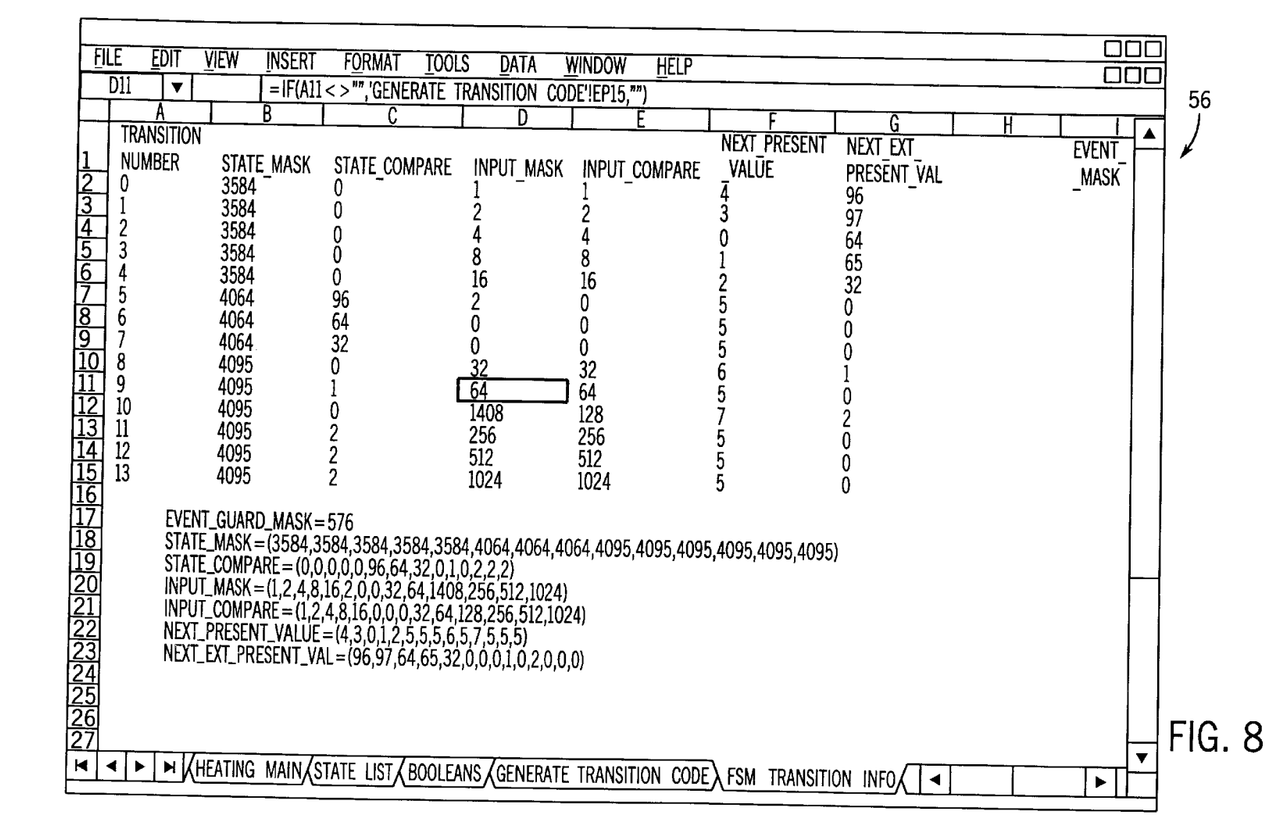

To implement the state transition table in FIG. 7, certain data for creating data structures is entered in a spreadsheet page 56 seen in FIG. 8.

To explain the operation of these data structures, it is first necessary to explain the definitions of the data in the object seen in FIG. 3, and the necessary definitions are as follows.

Present Value—A single digital value representing the present output state.

Extended Present Value—A sixteen-bit value representing the present output state.

Input—A thirty-two bit word representing the value of all inputs.

Event Guard Mask—An unsigned thirty-two bit word which indicates whether each bit of the input data is an event (=1) or a Guard Condition (=0). "Events" are evaluated when there is a transition from "0" to "1" while "guard conditions" are always evaluated.

State Mask—A 16-bit word for each state. The state mask forces to zero all "don't care" bits in the present state value.

State Compare—A 16-bit word for each state. All transitions departing from the same state will have the same state compare value, which must be matched to cause a transition to a next state.

Input Mask—A 32-bit word for each state. The input mask forces to zero all "don't care" bits in the input data.

Input Compare—A 32-bit word for each state. The input compare value must be matched to cause a transition to a next state.

Next Present Value—This is the next state value.

Next Ext Present Value—The next state value in 16-bit words.

FIG. 8 shows the values for these data item in a spreadsheet page 56 for the example of the state diagram seen in FIGS. 4–8. When a designated input is made by an operator, the data structure is created, as represented by process block 57 in FIG. 4, and the data seen in FIG. 8 is translated into the data structure 19 seen in FIG. 9. As seen in FIG. 9, this data structure 19 includes a State Mask table, a State Compare table, and Input Mask table, and Input Compare table and a Next State Value table.

Then, as represented by process block 58 in FIG. 4, the data structure 19 is loaded into a file format for downloading into the controller 11 for integration into the state machine object. The programming routine then terminates as represented by end block 59. The data file is then transferred by executing conventional network communications functions between the programming terminal 29 and the controller 11.

After the data structure 19 has been downloaded, a firmware routine is executed by microelectronic CPU 20 in the controller 11, and this routine is represented by the flow chart in FIG. 10. The startup of this routine is represented by the start block 61. First, a check is made, as represented by decision block 62, to see if any of the inputs has changed. If the answer is "NO" as represented by the "NO" branch from decision block 62, then the routine will jump to the end represented by end block 70. If the answer is "YES," as represented by the "YES" branch from decision block 62, then the current state of the inputs is calculated as Ad represented by process block 63. The logical or Boolean value of the current state of the inputs is calculated by "ANDing" the Input Value with the inverse of a Boolean product (AND function) of the previous Input Value and the Event Guard Mask). This passes through any guard conditions and any event transitions from "0" to "1".

Next, if the result does not include an override event, then each row of the state tables is checked in sequence, as represented by decision blocks 64, 65 and 66, to determine if a transition event has occurred such that a transition from one state to another state is due. To find a transition, the Input Value is ANDed with the Input Mask for that state and compared with the Input Compare value for that state, as represented by process block 65. Also, Extended Present State Value is ANDed with the States Mask and this is compared with the State Compare value for that state, as represented by process block 66. If both of these results are "true", then a transition is made by setting the Present State Value to the Next Present State Value, as represented by process block 67. For each state, if a "false" result is generated, the routine will check to see if this is the last transition be checked, as represented by decision block 68. If so, the routine is exited through the "YES" branch and the end block 70. If the answer from executing block 68 is negative, as represented by the "NO" branch, the routine returns to increment a counter to point to the next transition in the state tables, as represented by process block 64.

Thus, it can be seen how the present invention provides a method and apparatus for programming and executing the state machine control diagram and provides a data structure with tables for downloading into an object-oriented data structure in the HVAC controller for execution by an object-oriented execution routine in the controller.

It can also now be seen how programming system utilizes graphical programming displays, which are easy to observe and use in entering state machine logic programs. The state machine diagram was converted to tabular data which is entered into one or more spreadsheet pages. The tabular data included the defined output states, the defined input states and the defined transition states, whereby a given output state and a given set of inputs caused transition to a next output state.

The tabular data was translated, through execution of a routine in the Excel macro programming language, to generate a data structure with a plurality of tables having a logical interrelationship. This data structure was then loaded into one or more files for downloading. The files were then downloaded and the data was loaded into a state machine object data structure in the controller, where it was acted upon by an object-oriented execution module, referred to as a class execute method.

Still further, the invention provided for programming and execution of a state logic program which included superstates and two levels of substates.

This has been a description of a preferred embodiment of the invention. Various modifications will be apparent to those of ordinary skill in the art and these are intended to be practiced without departing from the scope of the invention. Therefore, reference is made to the claims which follow for defining the legal scope of the invention.

We claim:

1. A method of programming a controller for execution of a state machine logic program, the method comprising:
   entering data for a state machine logic program based upon a state diagram into a programming terminal, the diagram representing a plurality of current output states, a present state of a plurality of inputs, and at least one next output state, said programming terminal displaying said data on a screen for observation by a human operator;
   translating the data into at least one data structure for execution as part of a state machine logic program in the controller, the data structure including at least one state table;
   transferring the data structure from the programming terminal to the controller, the data structure including at least one of a state mask table and an event guard mask table;
   loading the data structure into an object in an object-oriented program in the controller; and
   executing an object-oriented execution routine in the controller, the controller operating on the data to execute the state machine logic program.

2. The method of claim 1, wherein the data for the state machine logic program is entered into a programming terminal in a plurality of pages in a spreadsheet application program running on the programming terminal.

3. The method of claim 2, wherein the data is translated into at least one data structure for execution as part of a state machine logic program in the controller by executing a translation routine resident in the programming terminal.

4. The method of claim 3, wherein the data structure is transferred from the programming terminal to the controller through a network.

5. The method of claim 4, wherein the data structure is transferred from the programming terminal to the controller as a binary file.

6. The method of claim 5, wherein the execution routine which operates on the data to execute the state machine logic program in the controller is a class method associated with the data structure through a state machine object in the controller.

7. The method of claim 6, wherein the data that is entered into the programming terminal for the state machine logic program provides for at least one output superstate and a plurality of output substates, which are included in said output superstate.

8. The method of claim 7, wherein the data that is entered into the programming terminal for the state machine logic program provides for at least one output superstate and a plurality of tiers of output substates, which are included in said output superstate.

9. A method of programming a VAV controller for execution of a state machine logic program related to HVAC control, the method comprising:
   entering data for a state machine logic program based upon a state diagram into a programming terminal, the diagram representing a plurality of current output states, a present state of a plurality of inputs, and at least one next output state, said programming terminal displaying said data on a screen for observation by a human operator;
   translating the data into at least one data structure for execution as part of a state machine logic program in the controller, the data structure including at least one state table;
   transferring the data structure from the programming terminal to the controller, the data structure including an event guard mask table;
   loading the data structure into an object in an object-oriented program in the controller; and
   executing an object-oriented execution routine in the controller, the controller operating on the data to execute the state machine logic program.

10. The method of claim 9, wherein the data for the state machine logic program is entered into a programming terminal in a plurality of pages in a spreadsheet application program running on the programming terminal.

11. The method of claim 10, wherein the data is translated into at least one data structure for execution as part of a state machine logic program in the controller by executing a translation routine resident in the programming terminal.

* * * * *